(12) United States Patent
McCready (10) Patent No.: US 9,429,939 B2
(45) Date of Patent: Aug. 30, 2016

(54) MULTIVARIATE MONITORING OF A BATCH MANUFACTURING PROCESS

(75) Inventor: Christopher Peter McCready, London (CA)

(73) Assignee: MKS Instruments, Inc., Andover, MA (US)

( * ) Notice: Subject to any disclaimer, the term of this patent is extended or adjusted under 35 U.S.C. 154(b) by 1137 days.

(21) Appl. No.: 13/441,513

(22) Filed: Apr. 6, 2012

(65) Prior Publication Data

US 2013/0268238 A1   Oct. 10, 2013

(51) Int. Cl.
*G05B 23/00* (2006.01)
*G05B 23/02* (2006.01)

(52) U.S. Cl.
CPC ......... *G05B 23/024* (2013.01); *G05B 23/0254* (2013.01)

(58) Field of Classification Search
CPC .................................... G05B 23/024
IPC .................................... G05B 23/024
See application file for complete search history.

(56) References Cited

U.S. PATENT DOCUMENTS

| | | |
|---|---|---|
| 5,135,688 A | 8/1992 | Nakamura et al. |
| 5,149,472 A | 9/1992 | Suganuma |
| 5,173,224 A | 12/1992 | Nakamura et al. |
| 5,347,446 A | 9/1994 | Iino et al. |
| 5,403,433 A | 4/1995 | Morrison et al. |
| 5,408,405 A | 4/1995 | Mozumder et al. |
| 5,442,562 A | 8/1995 | Hopkins et al. |
| 5,469,361 A | 11/1995 | Moyne |
| 5,479,340 A | 12/1995 | Fox et al. |
| 5,544,256 A | 8/1996 | Brecher et al. |
| 5,587,792 A | 12/1996 | Nishizawa et al. |
| 5,710,700 A | 1/1998 | Kurtzberg et al. |
| 5,786,999 A | 7/1998 | Spahr et al. |
| 5,815,397 A | 9/1998 | Saito et al. |
| 5,885,624 A | 3/1999 | Katsuta et al. |
| 5,900,633 A | 5/1999 | Solomon et al. |
| 5,949,678 A | 9/1999 | Wold et al. |
| 5,993,704 A | 11/1999 | Bader |
| 5,997,778 A | 12/1999 | Bulgrin |
| 6,090,318 A | 7/2000 | Bader et al. |

(Continued)

FOREIGN PATENT DOCUMENTS

| | | |
|---|---|---|
| DE | 101 14 211 A1 | 11/2001 |
| DE | 100 40 731 A1 | 3/2002 |

(Continued)

OTHER PUBLICATIONS

The Singapore Written Opinion and Search Report for Application No. 201105312-1, mailed on Sep. 14, 2012 (20 pgs.).

(Continued)

*Primary Examiner* — Mischita Henson
(74) *Attorney, Agent, or Firm* — Proskauer Rose LLP (57) ABSTRACT

A method, controller, and system for monitoring a manufacturing process are described. Measured values of multiple variables, including dependent variables, manipulated variables, or both, are received. Future values of the manipulated variables, future values of the dependent variables, or both, are predicted. A multivariate analysis is performed on a combination of (1) the measured values of the variables and (2) the future values of the manipulated variables, the future values of the dependent variables, or both, to generate multivariate statistics.

21 Claims, 6 Drawing Sheets

(56) References Cited

U.S. PATENT DOCUMENTS

| | | |
|---|---|---|
| 6,153,115 A | 11/2000 | Le et al. |
| 6,336,082 B1 | 1/2002 | Nguyen et al. |
| 6,354,145 B1 | 3/2002 | Fransson et al. |
| 6,368,883 B1 | 4/2002 | Bode et al. |
| 6,442,445 B1 | 8/2002 | Bunkofske et al. |
| 6,453,246 B1 | 9/2002 | Agrafiotis et al. |
| 6,456,899 B1 | 9/2002 | Gleason et al. |
| 6,528,331 B1 | 3/2003 | Bode et al. |
| 6,556,884 B1 | 4/2003 | Miller et al. |
| 6,564,119 B1 | 5/2003 | Vaculik et al. |
| 6,584,368 B2 | 6/2003 | Bunkofske et al. |
| 6,594,620 B1 | 7/2003 | Qin et al. |
| 6,607,577 B2 | 8/2003 | Vaculik et al. |
| 6,678,569 B2 | 1/2004 | Bunkofske et al. |
| 6,682,669 B2 | 1/2004 | Bulgrin et al. |
| 6,687,558 B2 | 2/2004 | Tuszynski |
| 6,718,224 B2 | 4/2004 | Firth et al. |
| 6,721,616 B1 | 4/2004 | Ryskoski |
| 6,741,903 B1 | 5/2004 | Bode et al. |
| 6,801,831 B2 | 10/2004 | Sasaki |
| 6,830,939 B2 | 12/2004 | Harvey et al. |
| 6,839,655 B2 | 1/2005 | Gross et al. |
| 6,876,931 B2 | 4/2005 | Lorenz et al. |
| 6,917,839 B2 | 7/2005 | Bickford |
| 6,967,899 B1 | 11/2005 | O'Brien, Jr. et al. |
| 6,968,253 B2 | 11/2005 | Mack et al. |
| 6,975,944 B1 | 12/2005 | Zenhausern |
| 6,983,176 B2 | 1/2006 | Gardner et al. |
| 7,003,490 B1 | 2/2006 | Keyes |
| 7,031,800 B2 | 4/2006 | Bulgrin |
| 7,043,401 B2 | 5/2006 | Taguchi et al. |
| 7,062,417 B2 | 6/2006 | Kruger et al. |
| 7,072,794 B2 | 7/2006 | Wittkowski |
| 7,107,491 B2 | 9/2006 | Graichen et al. |
| 7,151,976 B2 | 12/2006 | Lin |
| 7,189,964 B2 | 3/2007 | Castro-Perez et al. |
| 7,191,106 B2 | 3/2007 | Minor et al. |
| 7,198,964 B1 | 4/2007 | Cherry et al. |
| 7,216,005 B2 | 5/2007 | Shioiri et al. |
| 7,313,454 B2 | 12/2007 | Hendler et al. |
| 7,328,126 B2 | 2/2008 | Chamness |
| 7,433,743 B2 | 10/2008 | Pistikopoulos et al. |
| 7,465,417 B2 | 12/2008 | Hutson et al. |
| 7,597,827 B2 | 10/2009 | Frey |
| 7,622,308 B2 | 11/2009 | Hendler et al. |
| 7,840,297 B1 | 11/2010 | Tuszynski |
| 8,135,481 B2 | 3/2012 | Blevins et al. |
| 8,271,103 B2 | 9/2012 | Hendler et al. |
| 8,360,040 B2 | 1/2013 | Stewart et al. |
| 2002/0019672 A1 | 2/2002 | Paunonen |
| 2002/0038926 A1 | 4/2002 | Vaculik et al. |
| 2002/0107858 A1 | 8/2002 | Lundahl et al. |
| 2002/0143472 A1 | 10/2002 | Mutter |
| 2003/0011376 A1 | 1/2003 | Matsushita et al. |
| 2003/0033040 A1 | 2/2003 | Billings |
| 2003/0065462 A1 | 4/2003 | Potyrailo |
| 2003/0182281 A1 | 9/2003 | Wittkowski |
| 2004/0049295 A1 | 3/2004 | Wojsznis et al. |
| 2004/0055888 A1 | 3/2004 | Wikiel et al. |
| 2004/0064259 A1 | 4/2004 | Haaland et al. |
| 2004/0064357 A1 | 4/2004 | Hunter et al. |
| 2004/0083065 A1 | 4/2004 | Daniel et al. |
| 2004/0116814 A1 | 6/2004 | Stranc et al. |
| 2004/0122859 A1 | 6/2004 | Gavra et al. |
| 2004/0153815 A1 | 8/2004 | Volponi |
| 2004/0186603 A1 | 9/2004 | Sanford et al. |
| 2004/0204775 A1 | 10/2004 | Keyes et al. |
| 2004/0215424 A1 | 10/2004 | Taguchi et al. |
| 2004/0225377 A1 | 11/2004 | Kokotov et al. |
| 2004/0228186 A1 | 11/2004 | Kadota |
| 2004/0254762 A1 | 12/2004 | Hopkins et al. |
| 2004/0259276 A1 | 12/2004 | Yue et al. |
| 2005/0010318 A1 | 1/2005 | Lev-Ami et al. |
| 2005/0028932 A1 | 2/2005 | Shekel et al. |
| 2005/0037515 A1 | 2/2005 | Nicholson et al. |
| 2005/0043902 A1 | 2/2005 | Haaland et al. |
| 2005/0045821 A1 | 3/2005 | Noji et al. |
| 2005/0060103 A1 | 3/2005 | Chamness |
| 2005/0130321 A1 | 6/2005 | Nicholson et al. |
| 2005/0251276 A1 | 11/2005 | Shen |
| 2005/0268197 A1 | 12/2005 | Wold |
| 2006/0012064 A1 | 1/2006 | Hutson et al. |
| 2006/0039598 A1 | 2/2006 | Kim et al. |
| 2006/0058898 A1 | 3/2006 | Emigholz et al. |
| 2006/0111804 A1 | 5/2006 | Lin |
| 2006/0122807 A1 | 6/2006 | Wittkowski |
| 2006/0149407 A1 | 7/2006 | Markham et al. |
| 2006/0155410 A1 | 7/2006 | Yamartino |
| 2006/0184264 A1 | 8/2006 | Willis et al. |
| 2006/0259163 A1 | 11/2006 | Hsiung et al. |
| 2007/0021859 A1 | 1/2007 | Lev-Ami et al. |
| 2007/0100475 A1 | 5/2007 | Korchinski |
| 2008/0010531 A1 | 1/2008 | Hendler et al. |
| 2008/0015814 A1 | 1/2008 | Harvey, Jr. et al. |
| 2008/0082181 A1 | 4/2008 | Miller et al. |
| 2008/0082194 A1 | 4/2008 | Samardzija et al. |
| 2008/0082195 A1 | 4/2008 | Samardzija |
| 2008/0104003 A1 | 5/2008 | Macharia et al. |
| 2008/0125898 A1 | 5/2008 | Harvey et al. |
| 2008/0183311 A1 | 7/2008 | MacArthur et al. |
| 2008/0221720 A1 | 9/2008 | Hendler et al. |
| 2008/0262795 A1 | 10/2008 | Webb et al. |
| 2008/0275587 A1 | 11/2008 | Adams |
| 2009/0037013 A1 | 2/2009 | Hendler et al. |
| 2009/0055140 A1 | 2/2009 | Kettaneh et al. |
| 2009/0164171 A1 | 6/2009 | Wold et al. |
| 2009/0210081 A1 | 8/2009 | Sustaeta et al. |
| 2009/0228247 A1 | 9/2009 | Hendler et al. |
| 2009/0287320 A1 | 11/2009 | MacGregor et al. |
| 2009/0312851 A1 | 12/2009 | Mishra |
| 2010/0057237 A1 | 3/2010 | Kettaneh et al. |
| 2010/0082120 A1 | 4/2010 | Stephenson et al. |
| 2010/0191361 A1 | 7/2010 | McCready et al. |
| 2011/0276169 A1 | 11/2011 | Bourg et al. |
| 2012/0239167 A1 | 9/2012 | Carrette |

FOREIGN PATENT DOCUMENTS

| | | |
|---|---|---|
| EP | 0 524 317 A1 | 1/1993 |
| EP | 0737560 | 10/1996 |
| GB | 2394312 A | 4/2004 |
| GB | 2441640 A | 3/2008 |
| JP | 02-120019 | 5/1990 |
| JP | H04-266101 | 9/1992 |
| JP | 08-118443 | 5/1996 |
| WO | 03/085504 | 10/2003 |
| WO | 03/103024 | 12/2003 |
| WO | 2004/019147 | 3/2004 |
| WO | 2004/046835 | 6/2004 |
| WO | 2005/114338 | 12/2005 |
| WO | 2006/019448 | 2/2006 |
| WO | 2007/046945 A2 | 4/2007 |
| WO | 2009/151419 | 12/2009 |
| WO | 2010/085479 | 7/2010 |
| WO | 2012/067727 | 5/2012 |

OTHER PUBLICATIONS

Ahmed S. F., "A New Approach in Industrial Automation Application Embedded System Design for Injection Molding Machine," IEEE Xplore, Oct. 29, 2009, 5 pages.

Bai, et al., "IMPOS: A Method and System for Injection Molding Optimization," IEEE Xplore, Oct. 29, 2009, 5 pages.

C. E. Castro, et al., "Multiple criteria optimization with variability considerations in injection molding," Polymer Engineering and Science, vol. 47, p. 400, 2007.

C. M. Seaman, et al., "Multi-objective optimization of a plastic injection molding process," IEEE Transactions on Control Systems Technology, vol. 2, No. 3, pp. 157-168, 1994.

Chen, et al., "Application of Advanced Process Control in Plastic Injection Molding," IEEE Xplore, Oct. 29, 2009, 6 pages.

(56) References Cited

OTHER PUBLICATIONS

Chen, et al., "Injection Molding Quality Control by Integrating Weight Feedback into a Cascade Closed-Loop Control System," Polymer Engineering and Science, 2007, 11 pages.
International Search Report for International Application No. PCT/US2010/021486, Date of Mailing Jul. 5, 2010 (20 pages total).
D. Kazmer and C. Roser, "Evaluation of Product and Process Design Robustness," Research in Engineering Design, vol. 11, pp. 20-30, 1999.
D. Kazmer and S. Westerdale, "A model-based methodology for on-line quality control," Int. J. Adv. Manuf. Tech vol, vol. 42, pp. 280-292, 2009.
D. Kazmer, "Chapter 13: Quality Control," in Plastics Manufacturing Systems Engineering, ed Munich: Carl Hanser Verlag, 2009, pp. 387-418.
D. O. Kazmer, et al., "A Comparison of Statistical Process Control (SPC) and On-Line Multivariate Analyses (MVA) for Injection Molding," International Polymer Processing, vol. 23, pp. 447-458, 2008.
Dubay, et al., "An Investigation on the Application of Predictive Control for Controlling Screw Position and Velocity on an Injection Molding Machine," Polymer Engineering and Science, 2007, 10 pages.
Fung, et al., "Application of a Capacitive Transducer for Online Part Weight Prediction and Fault Detection in Injection Molding," Polymer Engineering and Science, 2007, 7 pages.
G. Sherbelis, et al., "The Methods and benefits of Establishing a Process Window," in Proceedings of the 55th Annual Technical Conference, ANTEC, Part 1 (of3), 1997, pp. 545-550.
J. W. Mann, "Process Parameter Control: the Key to Optimization," Plastics Engineering, vol. 30, pp. 25-27, 1974.
Knights, M., "Injection Mold Balance Unbalanced," Plastics Technology, http://www.ptonline.com/articles/200811fal.html; Nov. 2008, 5 pages.
Li, et al., "A Real-Time Process Optimization System for Injection Molding," Polymer Engineering and Science, 2009, 10 pages.
Li, et al., "Predicting the Parts Weight in Plastic Injection Molding Using Least Squares Support Vector Regression," IEEE Transactions on Systems, Man, and Cybernetics-Part C: Applications and Reviews, vol. 38, No. 6, Nov. 2008, 7 pages.
Liu, et al, "Identification and Autotuning of Temperature-Control System With Application to Injection Molding," IEEE Transactions on Control Systems Technology, vol. 17, No. 6, Nov. 2009, 13 pages.
M. Berins, "Standards for Molding Tolerances," in SPI Plastics Engineering Handbook of the Society of the Plastics Industy, Inc. (5th Edition) 5th ed: Kluwer Academic Publishers, 1991, pp. 821-844.
Mei, et al., "The Optimization of Plastic Injection Molding Process Based on Support Vector Machine and Genetic Algorithm," International Conference on Intelligent Computation Technology and Automation, 2008, 4 pages.
N. M. Morris and W. B. Rouse, "The Effects of Type of Knowledge Upon Human Problem Solving in a Process Control Task," IEEE Transactions on Systems, Man and Cybernetics, vol. SMC-15, No. 6 pp. 698-707, 1985.
N. Yonehara and Lito, "Finding an optimal operation conditions of plastic molding by artificial neural network," Nippon Kikai Gakkai Ronbunshu, C Hen/Transactions of the Japan Society of Mechanical Engineers, Part C, vol. 63, pp. 3538-3543, 1997.
P. Knepper and D. Kazmer, "Multi-objective velocity profile optimization," Charlotte, NC, United States, 2006, pp. 1093-1097.
R. H. Myers and D. C. Montgomery, "Response Surface Methodology: Process and Product Optimization Using Designed Experiments," in Wiley Series in Probability and Statistics, ed: Wiley Interscience, 1995, p. 248.
R. Ivester, et al., "Automatic tuning of injection molding by the virtual search method," Journal of Injection Molding, vol. 2/No. 3, Sep. 1998.

Shu, etal., "PID Neural Network Temperature Control System in Plastic Injecting-moulding Machine," Third International Conference on Natural Computation, 2007, 5 pages.
State space (controls), State space (controls)-Wikipedia, the free encyclopedia [online], 11 pages [retrieved on Sep. 14, 2010]. Retrieved from the Internet: <URL: http://en.wikipedia.org/wiki/State_Space_(controls)>.
Tan etal., "Adaptive Control of Ram Velocity for the Injection Moulding Machine," IEEE Transactions on Control Systems Technology, vol. 9, No. 4, Jul. 2001, 9 pages.
Triefenbach, F., "Design of Experiments: The D-Optimal Approach and Its Implementation As a Computer Algorithm," Bachelor's Thesis in Information and Communication Technology, Jan. 15, 2008, 84 pages.
Yang J. H., "Nonlinear Adaptive Control for Injection Molding Machines," IEEE Xplore, Oct. 29, 2009, 6 pages.
You et al., "Research on Temperature Measure and Control Method in Mold-Temperature-Control Solidification," IEEE International Conference on Control and Automation WeCP-18, Guangzhou, China—May 30 to Jun. 1, 2007, 4 pages.
Fugee Tsung, Jianjun Shi, C.F. J. Wu: "Joint Monitoring ofPID-Controlled Processes" Journal of Quality Technology, vol. 31, No. 3, Jul. 1, 1999, pp. 275-285, XP002579609.
Chen et al., "Plasma etch modeling using optical emission spectroscopy," J. Vac. Sci. Technol. A 14(3), May/Jun. 1996, pp. 1901-1906.
Eriksson et al., *Multi-and Megavariate Data Analysis: Part I Basic Princiules and Auulications* (2nd. ed.), Umetrics Academy (2006).
Eriksson et al., *Multi- and Megavariate Data Analysis: Part II Advanced Auulications and Method Extensions* (2nd ed.), Umetrics Academy (2006).
Gallagher et al., "Development and Benchmarking of Multivariate Statistical Process Control Tools for a Semiconductor Etch Process: Improving Robustness through Model Updating," IFAC ADCHEM'97, 78-83, Banff, Canada, Jun. 1997.
Goodlin et al., "Simultaneous Fault Detection and Classification for Semiconductor Manufacturing Tools," $201^{st}$ Meeting of the Electrochemical Society, International Symposium on Plasma Processing XIV, Abs. 413, Philadelphia, PA, May 2002, 16 pages.
Goodlin et al., "Simultaneous Fault Detection and Classification for Semiconductor Manufacturing Tools," Journal of the Electrochemical Society, 150 (12), May. 12, 2002, pp. G778-G784.
"Hotelling's T squared," Engineering Statistics Handbook [online], Ch. 6.5.4.3, 2 pages [retrieved on Jan. 13, 2006]Retrieved from the Internet: <URL: http://www.itl.nist.gov/div898/handbook/pmc/section5/pmc543.htm>.
Kresta et al., "Multivariate Statistical Monitoring of Process Operating Performance," The Canadian Journal of Chemical Engineering, vol. 69, Feb. 1991, pp. 35-47.
Jiang et al., "Fault Diagnosis for Batch Processes Based on Improved MFDA," 2005 IEEE International Conference on Systems Man, and Cybernetics, vol. 4, pp. 3420-3425, Oct. 10-12, 2005, IEEE, Piscataway, NJ, (ISBN 0-7803-9298-1).
Lymberopoulos et al., "Advanced Process Control Comes of Age," Semiconductor International [online], 5 pages, Jul. 1, 2004 [retrieved on Nov. 19, 2008]. Retrieved from the Internet: <URL: http://www.semiconductor.net/index.asp?layout=articlePrint&articleiD=CA430898>.
Martin et al., "Multivariate Statistical Process Control and Process Performance Monitoring," IFAC Dynamics and Control of Process Systems, 1999, XP-000911903, pp. 347-356.
Mason et al., "Applying Hotelling's Y Statistic to Batch Processes," J. Quality Technology, vol. 33, No. 4, Oct. 2001, pp. 466-479.
"Pearson's Correlation Coefficient," Teach/Me Data Analysis [online], 2 pages. [retrieved on Dec. 9, 2005] Retrieved from the Internet: <URL: http://www.vias.org/tmdatanaleng/cc_carr_coeff.html>.
"Process leaps without new hardware," EuroAsia Semiconductor [online], Nov. 2004, 3 pages [retrieved on Nov. 19, 2008]. Retrieved from the Internet: <URL http://www.euroasiasemiconductor.com/print_version.php?id=5677>.
Skumanich et al., "Advanced etch applications using tool-level data," Solid State Technology [online], 7 pages [retrieved on Jan.

(56) References Cited

OTHER PUBLICATIONS 27, 2005]. Retrieved from the Internet: <URL: http:/Isst.pennnet.com/articles/article_display.cfm?section=archi&article_id=206470&vers . . . >.

Smith et al., "From Sensor Data to Process Control: A Networked Framework," Semiconductor Manufacturing Magazine, Jul. 2004, 6 pages.

Smith et al., "Practical, Real-Time Multivariate FDC," Semiconductor International [online], Dec. 1, 2004, 6 pages [retrieved on Dec. 16, 2005]. Retrieved from the Internet: <URL: http://www.reed-electronics.com/semiconductor/index.asp?layout=articlePrint&articleiD=CA483628>.

Solomon et al., "Real-Time Measurement of Film Thickness, Composition, and Temperature by FT-IR Emission and Reflection Spectroscopy," in Semiconductor Characterization: Present Status and Future Needs, (Bullis et al.) AIP Press, 1996, pp. 544-548.

"TOOLweb Blue Box Professional: Enabling High Speed, Multi-User Connectivity and Data Sharing," Control & Information Technology [online], Mar. 2005, 4 pages [retrieved on Nov. 19, 2008]. Retrieved from the Internet: <URL: http://www.mksinst.com/docs/ur/ipcblueds.pdf>.

"TOOLweb Applications Support: AEC/APC Applications Engineering, Integration and Deployment Support," Control & Information Technology [online], Sep. 2005, 4 pages [retrieved on Nov. 19, 2008]. Retrieved from the Internet: <URL: http://www.mksinst.com/docs/UR/TWT3DS.pdf>.

"TOOLweb: APC & e-DIAGNOSTICS Suite," Control & Information Technology [online], 4 pages [retrieved on Nov. 19, 2008]. Retrieved from the Internet: <URL: http://www.mksinst.com/docs/ur/twmvads.pdf>.

"TOOLweb SenseLink: Web-Enables Existing Sensors," Control & Information Technology [online], 4 pages [retrieved on Nov. 19, 2008]. Retrieved from the Internet: <URL: http://www.mksinst.com/docs/ur/twsenselinkds.pdf>.

"User's Guide to SIMCA-P, SIMCA-P+,"Umetrics AB, Version 11.0, May 17, 2005, pp. 1-456.

Wang et al., "Process Monitoring in Principal Component Subspace: Part 1. Fault Reconstruction Study," 2004 IEEE International Conference on Systems, Man and Cybernetics, The Hague, The Netherlands, vol. 6, Oct. 10-13, 2004, pp. 5119-5124.

Wold et al., "Hierarchical Multiblock PLS and PC Models for Easier Model Interpretation and as an Alternative to Variable Selection," Journal of Chemometrics, vol. 10, 1996, pp. 463-482.

Wold et al., "Modelling and diagnostics of batch processes and analogous kinetic experiments," Chemometrics and Intelligent Laboratory Systems, vol. 44, Nos. 1-2, 1998, pp. 331-340.

Wold et al., "2.10 Batch Process Modeling and MSPC," in *Comprehensive* Chemometrics: Chemical and Biochemical Data Analysis, (Brown et al. Eds.), Oxford, UK: Elsevier, 37 pages (2009).

Xu et al., "A Novel Combination Method for On-Line Process Monitoring and Fault Diagnosis," IEEE ISIE 2005, Dubrovnik, Croatia, Jun. 20-23, 2005, pp. 1715-1719.

F. Yacoub, et al., "Product and Control in the Latent Variable Space of Nonlinear PLS Models," Chemometrics and Intelligent Laboratory Sytems, 70, pp. 63-74, 2004.

International Search Report for PCT/US2011/054719 dated Dec. 14, 2011, 11 pages.

Translation of Japanese Office Action Issued in Corresponding Japanese Patent Application No. 2013-538724, Apr. 1, 2014.

MULTIVARIATE MONITORING OF A BATCH MANUFACTURING PROCESS

TECHNICAL FIELD

The invention generally relates to data analysis and monitoring of a batch manufacturing process, and particularly to multivariate predictive monitoring of a batch manufacturing process.

BACKGROUND

Massive data sets can be collected during manufacturing processes and in connection with research and development activities. Manufacturing processes are sometimes categorized as either "batch" manufacturing processes or "continuous" manufacturing processes. In a batch manufacturing process, a series of steps are performed on a set of raw and/or processed materials over a finite duration to produce a product with desired properties. In some batch processes, processing occurs at a single workstation (e.g., a chamber or container) involving one or more process tools (e.g., process tools within the chamber or container). Examples of batch manufacturing processes include semiconductor wafer processing (e.g., processing a single wafer results in a set of chips), pharmaceutical processing (e.g., the process results in an intermediate or final output set of chemicals or drugs), or biotechnology processing (e.g., the process results in a particular biological fermentation or cell culture process). In contrast, in continuous manufacturing processes, materials are manufactured, processed or produced substantially without interruption.

As an example, in the semiconductor device manufacturing industry, as device geometries shrink to the nanometer scale, complexity in manufacturing processes increases, and process and material specifications become more difficult to meet. For example, a typical process tool used in current semiconductor manufacturing can be described by a set of several thousand process variables. The variables are generally related to physical parameters of the manufacturing process and/or tools used in the manufacturing process. In some cases, of these several thousand variables, several hundred variables are dynamic (e.g., changing in time during the manufacturing process or between manufacturing processes). The dynamic variables (e.g., gas flow, gas pressure, delivered power, current, voltage, and temperature) can change, sometimes non-linearly, based on a variety of factors, including, for example, a specific processing recipe, the particular step or series of steps in the overall sequence of processing steps, errors and faults that occur during the manufacturing process or changes in parameters.

Generally, process variables associated with a manufacturing process can be divided into two different types, X-type variables (also known as X-variables or observation-level variables) and Y-type variables (also know as Y-variables). X-type variables are indicative of factors, predictors, or indicators and are used to make projections or predictions about the manufacturing process or results of the manufacturing process. Y-type variables are indicative of yields or responses of the manufacturing processes. X-type variables and Y-type variables are generally related to each other. Often, the exact relationship between the X-type variables and Y-type variables is uncertain or difficult or impossible to determine. The relationship can, in some instances, be approximated or modeled by various techniques, such as linear approximation, quadratic approximation, polynomial fitting methods, exponential or power-series relationships, multivariate techniques (e.g., principal component analysis or partial least squares analysis), among others. In such cases, the relationship between X-type variables and Y-type variables can be inferred based on observing changes to one type of variables and observing responses on the other type of variables.

There are several existing approaches for monitoring a manufacturing process. However, these methods are difficult to apply to a batch manufacturing process. This is because an operator of a batch process is unlikely to know the quality of the product until the batch is finished, by which time it is too late to adjust the process to improve product quality. Even for those methods that can monitor a batch evolution in real time, the methods do not evaluate the effect of past and current behavior of the manufacturing process on its future behavior or troubleshoot the process using predicted process data. Therefore, existing methods make it difficult for an operator to detect future faults and develop avoidance strategies accordingly during process execution.

SUMMARY

Therefore, there is a need for improved methods and systems for monitoring a manufacturing process in real time or in near real time, especially in a batch manufacturing process, and determining useful information related to the manufacturing process. Instead of waiting until the end of a batch run to assess process operation, the present invention describes methods and systems for assessing the performance of a batch process in real time at various time points throughout the execution of the batch process, thus capturing the behavior of the batch as it evolves in time. In addition, to capture the impact of past and current process events on the remainder of the batch process, the present application describes systems and methods for predicting future trajectories of process variables and incorporating the predicted values in the monitoring scheme.

In one aspect, a computer-implemented method is provided for monitoring a manufacturing process. The method includes receiving, via a computing device, measured values of a plurality of variables of the manufacturing process. The variables include at least one of manipulated variables or dependent variables. The method also includes determining, with the computing device, future values of the manipulated variables or future values of the dependent variables, or a combination thereof. The manipulated variables represent process parameters whose values are directly assignable during the manufacturing process and the dependent variables represent process parameters whose values are dependent on process conditions. The method further includes performing multivariate analysis, via the computing device, on a combination of (1) the measured values of the variables and (2) at least one of the future values of the manipulated variables or the future values of the dependent variables to generate multiple multivariate statistics.

In another aspect, a multivariate monitor is provided for a batch-type manufacturing process associated with a finite duration. The monitor includes one or more sensors for measuring values of a plurality of variables of the manufacturing process up to a current maturity point of the finite duration. The variables include at least one of manipulated variables or dependent variables. The monitor includes a prediction module for computing future values of the dependent variables after the current maturity point. The dependent variables represent one or more process parameters whose values are not directly assignable. The monitor also includes an analysis module for performing multivariate analysis on the measured values of the variables and the future values of the dependent variables to generate multiple multivariate statistics, which represent a trajectory of estimated past, current and future behavior of the batch-type manufacturing process over at least a portion of the finite duration.

In some embodiments, the prediction module determines future values of the manipulated variables representative of a set of known values for setting the manipulated variables at one or more future points in time. The manipulated variables can be directly assignable during the manufacturing process. The analysis module can perform multivariate analysis on a combination of the measured values of the variables, the future values of the manipulated variables and the future values of the dependent variables to generate the multivariate statistics.

In some embodiments, the trajectory includes predicted future behavior of the batch-type manufacturing process from the current maturity point to the end of the finite duration. In some embodiments, the monitor includes a fault detection module for predicting a future fault of the manufacturing process based on the trajectory.

In another aspect, a system is provided for monitoring a manufacturing process. The system includes a receiving means for receiving measured values of a plurality of variables of the manufacturing process. The variables include at least one of manipulated variables or dependent variables. The system includes a determination means for determining future values of the manipulated variables, future values of the dependent variables, or a combination thereof. The manipulated variables represent process parameters whose values are directly assignable during the manufacturing process and the dependent variables represent process parameters whose values are dependent on process conditions. The system also includes an analysis means for performing multivariate analysis on a combination of (1) the measured values of the variables and (2) at least one of the future values of the manipulated variables or the future values of the dependent variables to generate multiple multivariate statistics.

In other examples, any of the aspects above can include one or more of the following features. The manufacturing process can be a batch-type manufacturing process associated with a finite duration. In some embodiments, the multivariate analysis is performed based on at least one unfolded data matrix established using observation-wise unfolding of a batch data array, such that each row of the unfolded matrix includes observation of the variables at a unique time sample within the finite duration. In some embodiments, the variables are measured or known up to a current maturity point within the finite duration of the batch-type manufacturing process. In some embodiments, the estimated future values of the dependent variables span from after the current maturity point to the end of the finite duration.

The multivariate statistics can represent a trajectory of estimated past, current and future behavior of the manufacturing process. This trajectory can be used to predict a future fault of the manufacturing process. In some embodiments, the multivariate statistics are compared with a time-varying reference model of the manufacturing process to detect a fault in the manufacturing process.

In some embodiments, the dependent variables are not directly assignable during the manufacturing process. The values of the dependent variables can be dependent on at least one of: (1) past values of the dependent variables, (2) past values of the manipulated variables, or (3) future values of the manipulated variables.

In some embodiments, the future values of the manipulated variables represent known values for setting the manipulated variables at one or more future points in time subsequent to the maturity point.

In some embodiments, the future values of the dependent variables are predicted using at least one of an imputation method or a regression method based on the measured values of the plurality of variables and optionally, the future values of the manipulated variables.

In some embodiments, each of the multivariate statistics comprises at least a multivariate score, a Hotelling's $T^2$ value, a DModX value, or any combination thereof. In some embodiments, a multivariate score comprises a principal components analysis t-score or a partial least squares analysis t-score.

In some embodiments, a second set of future values of the manipulated variables is received, which represent hypothesized values for setting the manipulated variables. A multivariate analysis is performed on a combination of (1) the measured values of the variables, (2) the second set of future values of the manipulated variables and (3) the future values of the dependent variables to generate a second set of multivariate statistics. The second set of multivariate statistics can predict an effect of the second set of future values of the manipulated variables on the manufacturing process.

Some implementations include any of the above-described aspects featuring any of the above embodiments or benefits thereof.

These and other features will be more fully understood by reference to the following description and drawings, which are illustrative and not necessarily to scale. Although the concepts are described herein with respect to a manufacturing process, particularly a semiconductor process, it will be apparent to one of skill in the art that the concepts have additional applications, for example, pharmaceutical or biotechnical applications, metallurgic and mining applications, financial data analysis applications, or other applications involving a large number of data points or observations.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
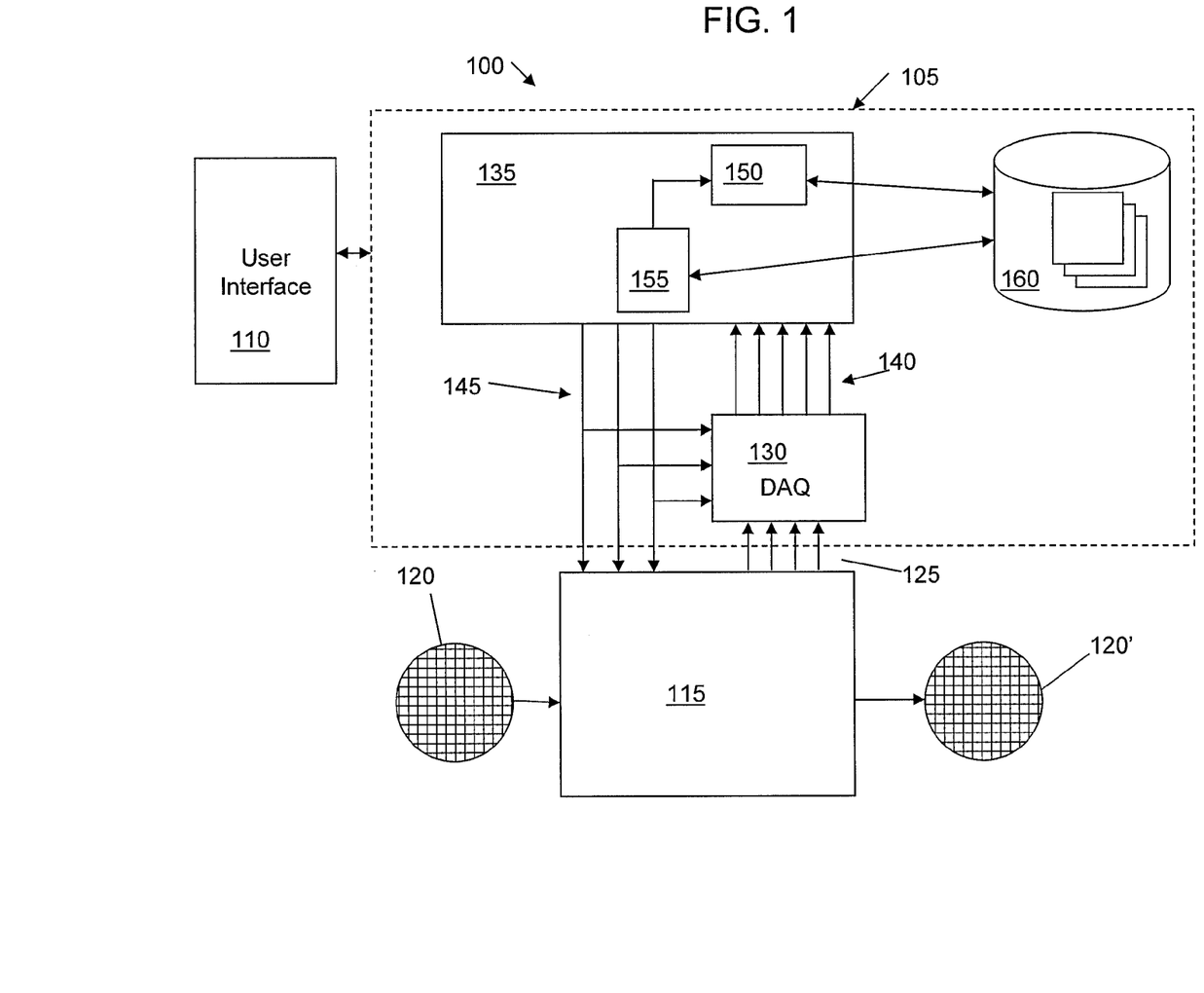
FIG. 1 shows a block diagram of a system that embodies aspects of the invention.

FIG. 1 shows an exemplary system 100 that includes a processor 105 and a user interface 110. The user interface 110 can include a computer keyboard, mouse, other haptic interfaces, a graphical user interface, voice input, or other input/output channel for a user to communicate with the processor 105 in response to stimuli from the processor 105 (e.g., to specify values for constraints). The user interface 110 can include a display such as a computer monitor. The processor 105 is coupled to a processing facility 115. The processing facility 115 performs manufacturing or processing operations. For example, in the context of the semiconductor industry, the processing facility performs processing functions on a wafer 120 and outputs a processed wafer 120'. The wafer 120 and processed wafer 120' are illustrative only, and can represent any input and/or output of a batch manufacturing process (e.g., a pharmaceutical granulation or blending or other unit processing step, or biotechnology fermentation, cell culture, or purification process). The processing facility 115 can include tools or processes (not shown) for performing tasks such as cleaning, purification, depositing material, mixing materials or chemicals, dissolving materials or chemicals, removing materials, rinsing materials, and/or performing other functions within the processing facility 115.

In some embodiments, the tools or processes include multiple stations or units within the facility 115. The functions of the facility 115 can be characterized by variables that represent various physical parameters of the manufacturing process, including, for example, gas pressure, gas flow rate, temperature, time, and/or plasma or chemicals or biochemical concentrations, among many others. In addition, physical parameters corresponding to the variables can be monitored and measured to produce outputs 125. In some embodiments, the outputs 125 include measurements of the process parameters sampled at one or more instances from the beginning of a batch manufacturing process up to a current time (known as a maturity point) of the batch process. The set of measured values for one or more process variables up to the current maturity point can be denoted as $X_k$. In general, a maturity point represents the amount of completion in time of a batch process.

In some embodiments, the variables measured during the batch manufacturing process are X-type variables. These X-type variables can be further divided into subsets or sub-types. One subset of X-type variables are manipulated variables. Another subset of X-type variables are dependent variables. Therefore, the set of measured variable data $X_k$ includes both measured values of manipulated variables and measured values of dependent variables. Manipulated variables represent physical parameters that can be directly assignable such as, for example, setpoints for temperature, chemical concentrations, pH, gas pressure, supplied power, current, voltage, or processing time. In some embodiments, the system 100 specifies setpoint or target values assignable to one or more manipulated variables at certain future points in time (i.e., beyond the current maturity point). These future setpoint or target values of the manipulated variables can be denoted as $X_{mv}$.

Dependent variables represent physical parameters that are not assignable during a manufacturing process. Generally, values of dependent variables are dependent on one or more process conditions. In some embodiments, values of dependent variables are related to, associated with, or dependent on values of one or more manipulated variables, either via known relationships or unknown relationships, which may or may not be empirically determinable and/or modeled. In some embodiments, current or future values of dependent variables depend on at least one of: 1) past values of dependent variables, 2) past values of manipulated variables, or 3) future values of manipulated variables. Examples of dependent variables include chamber temperature, gas pressure, temperature or pressure gradients, impurity levels, spectral and/or chromatographic profiles, and others.

As shown in FIG. 1, the processing facility 115 is coupled to the processor 105 by a data acquisition module 130. The data acquisition module 130 receives the outputs 125, including the measured variable data $X_k$, from the processing facility 115. In some embodiments, the data acquisition module 130 performs buffering, multiplexing, signaling, switching, routing, formatting, and other functions on the data to put the data in a format or condition for suitable communication or retransmission to other modules of the processor 105.

The system 100 also includes a monitoring module 135 configured to receive data from the data acquisition module 130, e.g., via communication links 140. In some embodiments, the data acquisition module 130 relays the output 125 from the processing facility 115 to the monitoring module 135. The monitoring module 135 includes a prediction component 150 and an analysis component 155. The prediction component 150 uses a time-varying model to predict future values of one or more dependent variables at different future points in time until, for example, the end of a batch manufacturing process. The predicted future values of one or more dependent variables are herein denoted as $X_{D\text{-}future}$. The $X_{D\text{-}future}$ data reflect the effect of the dependent and manipulated variables measured up to the current maturity ($X_k$) and, optionally, future values of the manipulated variables ($X_{mv}$) on the values of the dependent variables for the remainder of the process. The analysis component 155 determines the quality of a batch process by computing a trajectory that illustrates the time-varying difference between (a) measured and predicted values of various process variables and (b) ideal values of the variables. Based on the trajectory, an operator can predict future faults for the remainder of the batch.

The system 100 also includes a memory 160. The memory 160 can be used to store different data sets generated at each maturity point. For example, at a current maturity point, the memory 160 can store the measured past and present values of the process variables $X_k$, predicted values of the manipulated variables $X_{mv}$, and predicted values of the dependent variables $X_{D\text{-}future}$.

Figure 2:
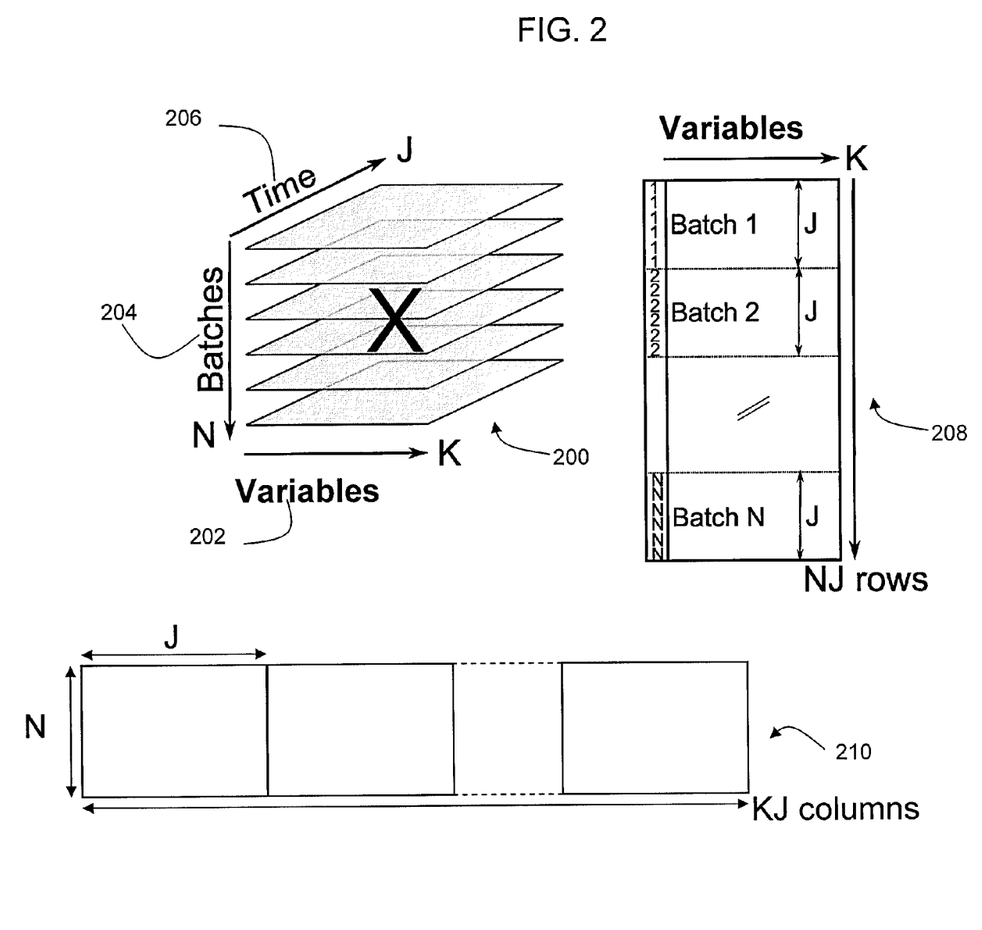
FIG. 2 shows techniques for unfolding batch data.

To facilitate mathematical analysis of a batch process for the purpose of monitoring the process, three-dimensional data related to the batch process can be unfolded and stored in a two-dimension matrix using a number of different approaches. FIG. 2 illustrates an observation-wise unfolding technique used to represent three-dimensional batch data 200 as a two-dimensional matrix 208. The three-dimensional batch data 200 includes values of multiple process variables 202 either measured or predicted for one or more time samples 206 and associated with one or more batches 204. In some embodiments, the process variables 202 are X-type variables. The resulting two-dimensional matrix 208 shows that each row includes measured and predicted values (i.e. observations) of the process variables 202 corresponding to a unique point in time. A batch-wise unfolding approach may also be used to unfold the batch data 200. The resulting two-dimensional matrix 210 shows that each row includes values of the variables 202 over time corresponding to a unique batch. In some applications, using the observation-wise unfolding technique to unfold batch data is advantageous because the resulting batch control charts of multivariate metrics generated (not shown) are similar to typical univariate control charts that are familiar to operators and scientists alike, thus allowing time-dependent process events to be visualized intuitively.

Figure 3:
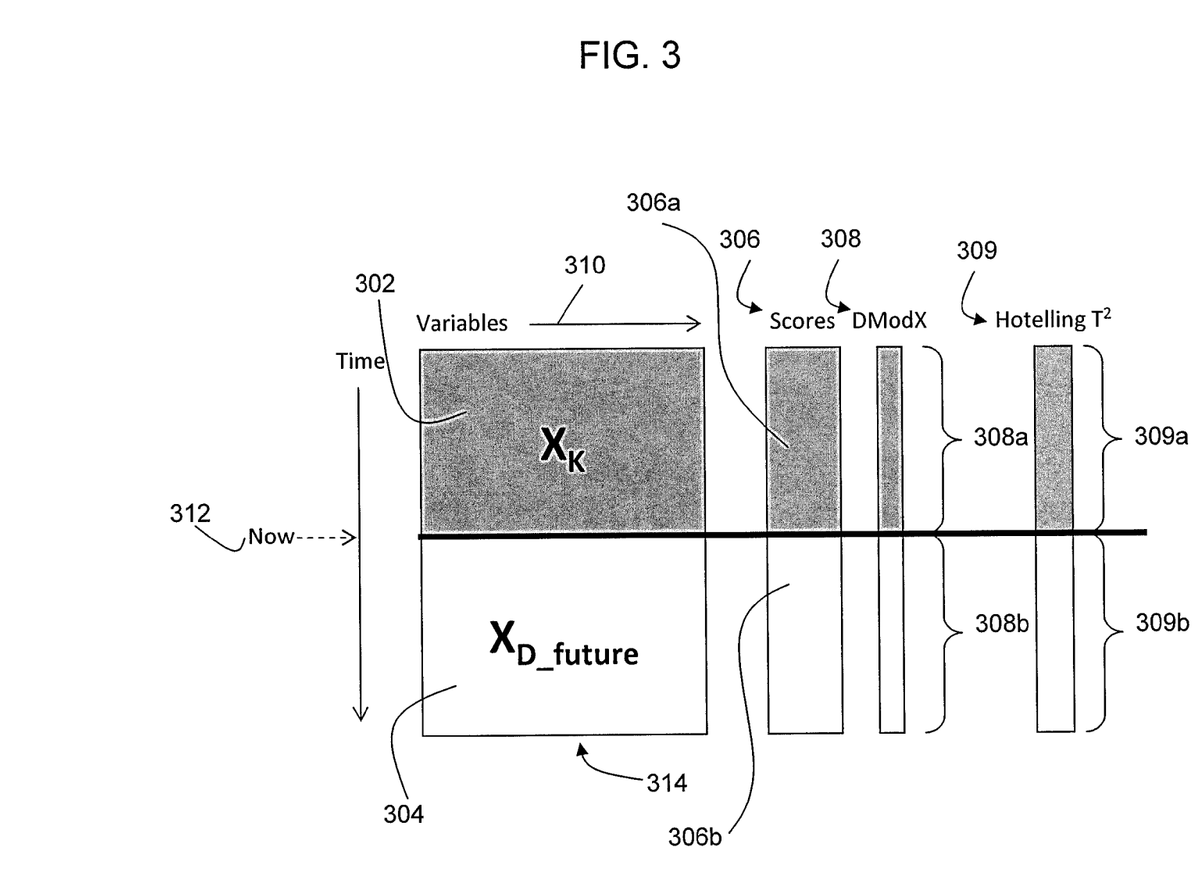
FIG. 3 shows an exemplary set of data matrices generated for monitoring a batch manufacturing process.

FIG. 3 shows exemplary data matrices generated at a current maturity point in a batch manufacturing process for the purpose of monitoring the batch process. The data matrix 314, which includes sub-matrices $X_k$ 302 and $X_{D\text{-}future}$ 304, is generated using the observation-wise unfolding technique. Based on the data matrix 314, multivariate metrics can be generated to approximate the behavior of the batch process, including predicting future behavior of the batch process subsequent to the current maturity point 312. The multivariate metrics include, for example, a multivariate scores matrix 306, a DModX matrix 308, a Hotelling $T^2$ matrix 309, or a combination thereof.

In some embodiments, the sub-matrix $X_k$ 302 stores measurements of physical parameters corresponding to a set of process variables 310 of the batch process. The physical parameters can be sampled at one or more time instances from the beginning of the batch manufacturing process up to the current maturity point 312. Due to the use of the observation-wise unfolding technique, each column of the sub-matrix $X_k$ 302 captures the trajectory of a single variable as it progresses with time up to the current maturity point 312. Measurements of the physical parameters can be performed by the physical facility 115, the data acquisition module 130 or the monitoring module 135, or a combination thereof.

In some embodiments, the sub-matrix $X_{D\text{-}future}$ 304 stores predicted values of a set of dependent variables at one or more time samples subsequent to the current maturity point 312. Due to the use of the observation-wise unfolding technique, each column of the sub-matrix $X_{D\text{-}future}$ 304 approximates a future trajectory of a single dependent variable as it progresses with time. In some embodiments, values of the dependent variables at various future points in time are computed by the prediction component 150 of the monitoring module 135. The prediction component 150 can predict the future values of the dependent variables based on the measured variable values $X_k$ 302. The prediction component 150 can compute the future trajectory of a dependent variable using one or more methods including: 1) imputation using a principal component analysis model or a partial least squares multivariate model and 2) a regression model.

The multivariate scores matrix 306, the DModX matrix 308 and the Hotelling $T^2$ matrix 309 are computed based on the data matrix 314, which includes the sub-matrix $X_k$ 302 for storing measured values of both dependent and manipulated variables and the sub-matrix $X_{D\text{-}future}$ 304 for storing predicted future values of the dependent variables. In some embodiments, the analysis component 155 of the monitoring module 135 is configured to compute the multivariate scores matrix 306, the DModX matrix 308 and/or the Hotelling $T^2$ matrix 309. In general, each value of the multivariate scores matrix 306, the DModX matrix 308 or the Hotelling $T^2$ matrix 309 summarizes process performance, at a particular point in time based on actual or estimated batch behavior (represented by the data matrix 314). Each of the matrices can be compared to a desired batch behavior (e.g., represented by a multivariate model) to identify deviations. Specifically, the multivariate scores matrix 306 includes multivariate score values 306a quantifying the deviations associated with past and current times of a batch run and multivariate score values 306b predicting the deviations associated with future times of the batch run. Similarly, the DModX matrix 308 includes DModX values 308a quantifying the deviations in the correlation structure of $X_k$ up to the current maturity 312 and DModX values 308b predicting the deviations associated with future times of the batch run. The Hotelling $T^2$ matrix 309 includes Hotelling $T^2$ values 309a quantifying the deviations in the correlation structure of $X_k$ up to the current maturity 312 and Hotelling $T^2$ values 309b predicting the deviations associated with future times of the batch run. In some embodiments, the predicted future values of the dependent variables in the sub-matrix $X_{D\text{-}future}$ 304 makes it possible for the analysis component 155 to estimate the future multivariate score values 306a, the future DModX values 308b and/or the future Hotelling $T^2$ values 309b.

Generally, each value in the multivariate statistics matrix 308, the DModX matrix 308 or the Hotelling $T^2$ matrix 309 can be computed using regression analysis based on one or more projection methods such as principle component analysis or partial least squares analysis or using other types of multivariate analysis approaches. Using multivariate analysis is advantageous in many applications because it can extract important information from a large data set and present the results as interpretable plots based on the principle of projection.

In some embodiments, each multivariate score in the multivariate scores matrix 306 is a principal component analysis score, a partial least squares score (sometimes called projection to latent structures), or any combination thereof.

In some embodiments, the analysis component 155 performs a Hotelling calculation or a DModX calculation on the data matrix 314 by means of a principal components or partial least squares analysis to determine a $T^2$ or DModX value, respectively. A $T^2$ value can be calculated according to the following equation:

$$T^2 = \left(\frac{\bar{x} - \mu_0}{\sigma}\right)^T S^{-1} \left(\frac{\bar{x} - \mu_0}{\sigma}\right)$$

where:

$\sigma$=standard deviation for a particular variable, based on data acquired for previous batches, $$\bar{x} = \begin{bmatrix} \bar{x}_1 \\ \bar{x}_2 \\ M \\ \bar{x}_p \end{bmatrix},$$

measured value of variables, for p variables, $$\mu_0 = \begin{bmatrix} \mu_1^0 \\ \mu_2^0 \\ M \\ \mu_p^0 \end{bmatrix},$$

mean value of variables based on previous batches, for p variables, $S^{-1}$=an inverse covariance or correlation matrix, which is the inverse of the covariance or correlation matrix, S, illustrated below:

$$S = \begin{bmatrix} \overline{S}_1^2 & \overline{S}_{12}^2 & \overline{S}_{13}^2 & \Lambda & \overline{S}_{1p}^2 \\ & \overline{S}_2^2 & \overline{S}_{23}^2 & \Lambda & \overline{S}_{2p}^2 \\ & & \overline{S}_3^2 & \Lambda & \overline{S}_{3p}^2 \\ & & & O & M \\ & & & & \overline{S}_p^2 \end{bmatrix}$$

where:

$$S_{ij} = \frac{1}{N-1} \sum_{i=1}^{k} \sum_{j=1}^{n_i} (x_{ij} - \bar{x})(x_{ij} - \bar{x})^T,$$

where indices i and j identify the matrix element for both S and x in a generalized k×n matrix.

In the multivariate modeling example above, the X-variables in the above equations usually are score vectors of a principal components or partial least squares model usually with mean values ($\mu_0$) equaling zero. Because these score vectors are orthogonal, the matrices S and $S^{-1}$ are diagonal with the variances and respective inverse variances of each component score vector as diagonal elements.

A t-score value can be thought of as a projection onto a line (e.g., a principal components or partial least squares model axis) in a p-dimensional space that provides an acceptable approximation of the data (e.g., a line that provides an acceptable least squares fit). A second t-score can be used (e.g., a projection onto a line orthogonal to the first line) in some embodiments. In general, a $T^2$ value is a calculation of the weighted distance of manufacturing process variables for an output (e.g., the wafer 120') of the manufacturing process relative to an output produced under normal process operation or based on predicted values of dependent variable data and/or manipulated variable data. One way to understand the meaning of the $T^2$ value is to consider it in terms of a geometric description. A normal manufacturing process is a cluster of data points in a p-dimensional space, where p is the number of measured manufacturing process variables. The pertinent space can also be the reduced dimensionality space of the scores. Hotelling's $T^2$ value is the squared distance of a new output from the center of this cluster of data points weighted relative to the variation output of the in the normal process condition. The variation is often illustrated as a p-dimensional hyper-ellipse that bounds the cluster of data points. In general, Hotelling-type calculations can be used to, for example, determine whether a particular point is an outlier (e.g., outside the hyper-ellipse) with respect to the remainder of the data set. More specifically, a Hotelling calculation can be used to determine whether a particular measured parameter is outside an alarm limit or outside the knowledge space, as determined by a mathematical model for the process parameters being observed.

Another example of a multivariate statistic is a DModX calculation or residual standard deviation calculation. A DModX calculation involves calculating the distance of a particular data point from a location in a p-dimensional space that represents a preferred location (e.g., a location associated with an ideal batch). The DModX value is calculated using a principal components or partial least squares analysis that maps the p-dimensional variable to a lower order (e.g., less than order p) dimensional variable (e.g., a score space). Mathematically, the DModX value is the orthogonal component (or residual) resulting from the principal components or partial least squares analysis. A DModX value can be indicative of a range of values (e.g., a "tolerance volume") about one or more variables (e.g., data points) in the mathematical model.

Figure 4:
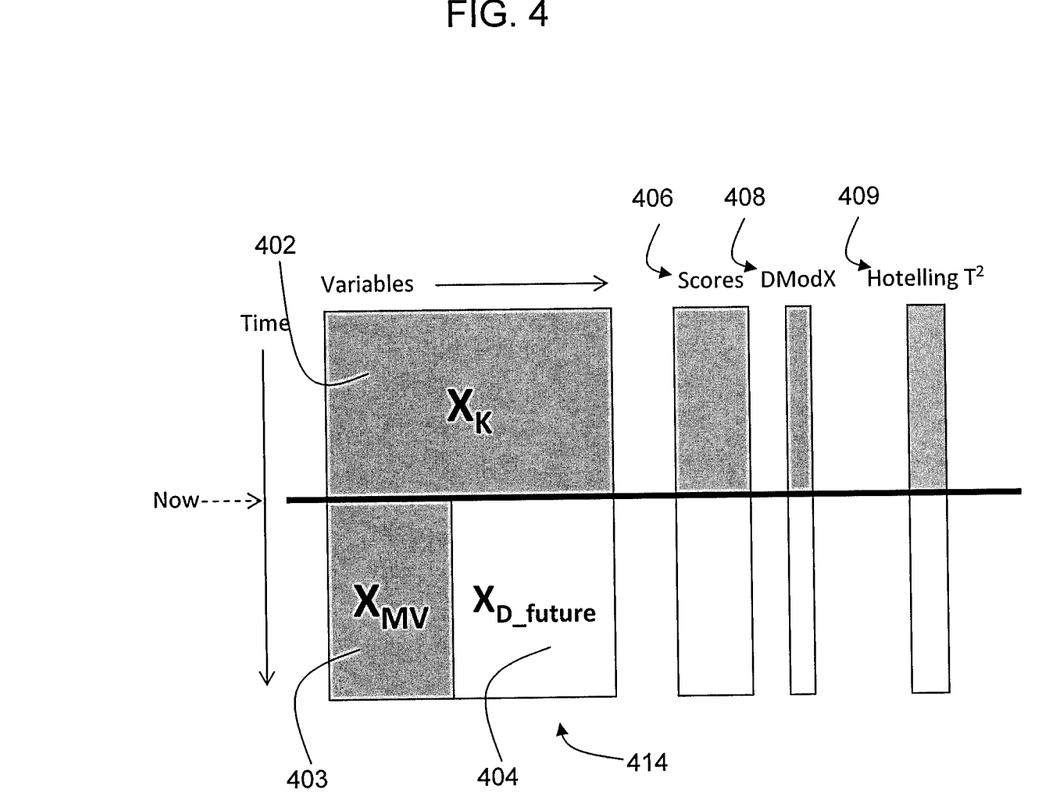
FIG. 4 shows another exemplary set of data matrices generated for monitoring a batch manufacturing process.

FIG. 4 shows another set of exemplary data matrices generated at a current maturity point in a batch manufacturing process for the purpose of monitoring the batch process. Data matrix 414 can be generated using the observation-wise unfolding technique described above. In some embodiments, the sub-matrices $X_K$ 402 and $X_{D\text{-}future}$ 404 of the data matrix 414 are substantially the same as the corresponding sub-matrices $X_K$ 302 and $X_{D\text{-}future}$ 304 of FIG. 3. In addition to sub-matrices $X_K$ 402 and $X_{D\text{-}future}$ 404, the data matrix 414 includes another sub-matrix $X_{mv}$ 403, which represents the known future setpoint or target values for the manipulated variables of the batch process. These setpoint or target values are assigned by the facility 115 to the manipulated variables at one or more future points in time. These values thus represent desired values for the manipulated variables, which are distinguished from the actual measurements of the manipulated variables included in the matrix $X_K$ 402. In some embodiments, the future values of the dependent variables $X_{D\_future}$ are computed based on a combination of the measured variable data $X_K$ 402 and the future values of the manipulated variables $X_{mv}$ 403.

According to FIG. 4, the multivariate statistics (e.g., the multivariate scores, DModX, $T^2$) are estimated based on a combination of known values $X_{MV}$ (e.g., future values of manipulated variables), estimated values $X_{D\_future}$ (future values of dependent variables), and measured values $X_K$ (known past and present values of manipulated and dependent variables). Specifically, using the data matrix 404, the analysis component 155 can generate a multivariate scores matrix 406, a DModX matrix 408, and/or a Hotelling $T^2$ matrix 409 to capture the difference over time between actual or predicted batch behavior (represented by the matrix 414) and desired batch behavior (specified by a multivariate model). In some embodiments, the matrices 406, 408 and 409 are more accurate than the corresponding matrices 306, 308 and 309, respectively, due to the incorporation of extra information in the sub-matrix $X_{mv}$ 403.

Figure 5:
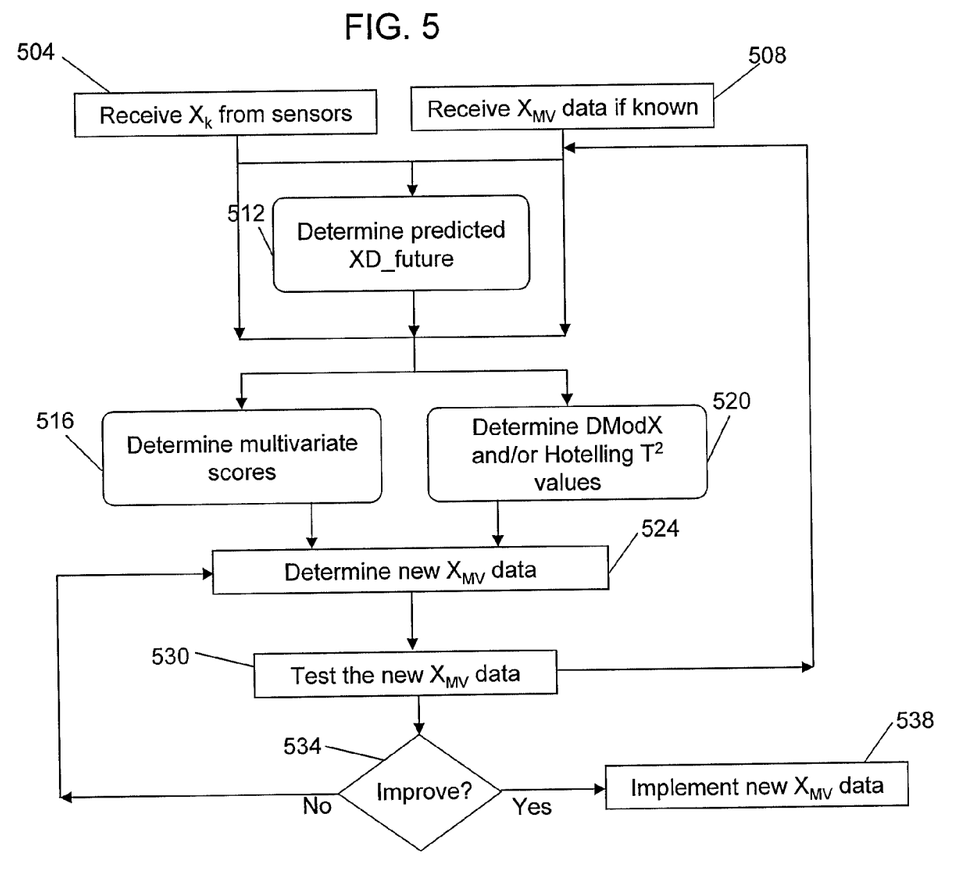
FIG. 5 shows a flow chart illustrating a method for monitoring operating parameters of a manufacturing process.

FIG. 5 is a flow chart 500 illustrating a method for monitoring operating parameters of a batch manufacturing process. The method depicted in the flow chart 500 can be implemented by, for example, the monitoring module 135 of FIG. 1 using the monitoring scheme of FIG. 3 or FIG. 4. In step 504, measured values of a set of process variables $X_k$ is received from one or more sensors used in the batch manufacturing process, or from other measuring devices. In step 508, future values of the manipulated variables $X_{MV}$ are received, if these values are known. These future values of the manipulated variables can represent setpoint or target values assignable to the manipulated variables at one or more future points in time. From the measured variable data $X_k$ received at step 504 and optionally, future values for the manipulated variables $X_{MV}$, future values of one or more dependent variables $X_{D\_future}$ are computed at step 512. Such computation can be performed by the prediction component 150 of the monitoring module 135.

Based on the data sets $X_{D\_future}$ and $X_k$ (and optionally $X_{MV}$), multivariate statistics are determined, including determining multivariate scores at step 516 and/or determining DModX or Hotelling $T^2$ values at step 520. In some embodiments, the multivariate statistics are calculated by a multivariate analytical approach. In general, the multivariate statistics computed at steps 516 and 520 can include Hotelling $T^2$ values, DModX values, principal components scores, partial least squares scores, some combination of these, or all of these statistics. In some embodiments, the statistics are constrained by, for example, user-specified constraints, tolerance levels, or threshold values.

The predicted multivariate scores from step 516, the DModX values and/or the Hotelling $T^2$ values from step 520 indicate whether future batch behavior is likely to deviate from a desired batch trajectory or outside of a tolerance range of the desired batch trajectory. If it is the case, certain operating parameters corresponding to one or more manipulated variables can be adjusted during a batch run to prevent the deviation. In some embodiments, these operating parameters are determined by performing a search for manipulated variable values that satisfy one or more objectives, such as minimizing an amount of deviation in the multivariate scores, DModX values and/or Hotelling $T^2$ values from a desired trajectory. In some embodiments, to achieve the desired batch behavior, the values of one or more manipulated variables are adjusted so as to change the values of one or more dependent variables. As explained above, dependent variables can be a function of manipulated variables such that the value of a particular dependent variable functionally depends on the value of one or more manipulated variables (e.g., $X_D=f(X_{MV})$). The functional relationship can be known or empirically inferred, determined, or modeled. In embodiments in which dependent variables are functionally related to the manipulated variables, a closed-loop process can be used to adjust values of the operating parameters associated with the manipulated variables to more closely approximate the desired values of the dependent variables.

If required, adjustments to the values of one or more manipulated variables are determined at step 524. In some embodiments, the adjustments are represented by a new set of manipulated variable data $X_{MV\_new}$, which specify new setpoint or target values for setting the manipulated variables. These new values can recalibrate or encourage one or more dependent variables to converge on desirable values. At step 530, the proposed adjustments are evaluated to determine whether process performance will improve as a result. To accomplish this, the new manipulated variable data $X_{MV\_new}$ is supplied to the monitoring module 135. Based on a combination of the new manipulated variable data $X_{MV\_new}$, the measured variable values $X_K$, and the future values of dependent variables $X_{D\_future}$, the monitoring module 135 computes another set of multivariate statistics (e.g., multivariate scores, DModX, Hotelling $T^2$) using the approach described above with reference to FIG. 4. The new multivariate statistics and/or predicted scores allows an operator to determine the likely effect of the new manipulated variable data $X_{MV\_new}$ on the future behavior of the remaining batch process before any actual implementation takes place.

Therefore, at step 534, if the new manipulated variable data $X_{MV\_new}$ do not enable batch quality to converge to an ideal batch trajectory or to within a tolerance range from the ideal batch trajectory, steps 524 and 530 are repeated so that another set of manipulated variable values $X_{MV\_new}$ can be determined and tested. On the other hand, if the new manipulated variable values $X_{MV}$ are likely to improve batch quality, the new values are implemented at step 538 by, for example, communicating them to one or more process tools. The process tools can be automatically or manually adjusted based on the determined values. Exemplary control actions for adjusting certain operating parameters include, for example, adjusting a recipe based on raw materials (e.g., initial conditions), a mid-process adjustment in response to a variation or change in operating conditions, an update of setpoint values at periodic intervals in the process, or combinations of these.

Figure 6A:
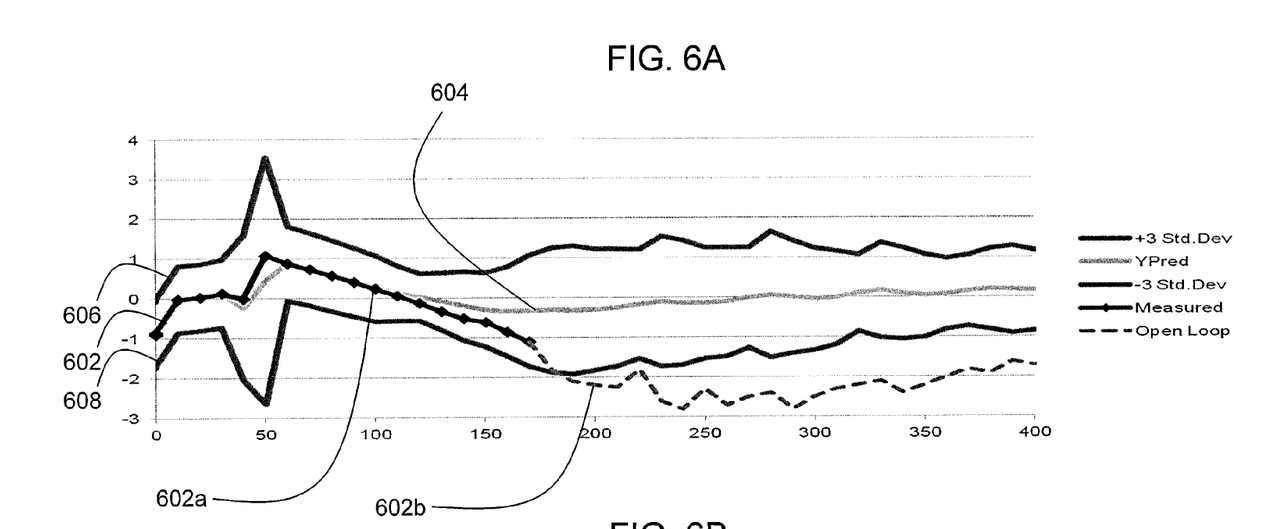
FIGS. 6A and 6B show exemplary trajectories for a batch manufacturing process.
Figure 6B:
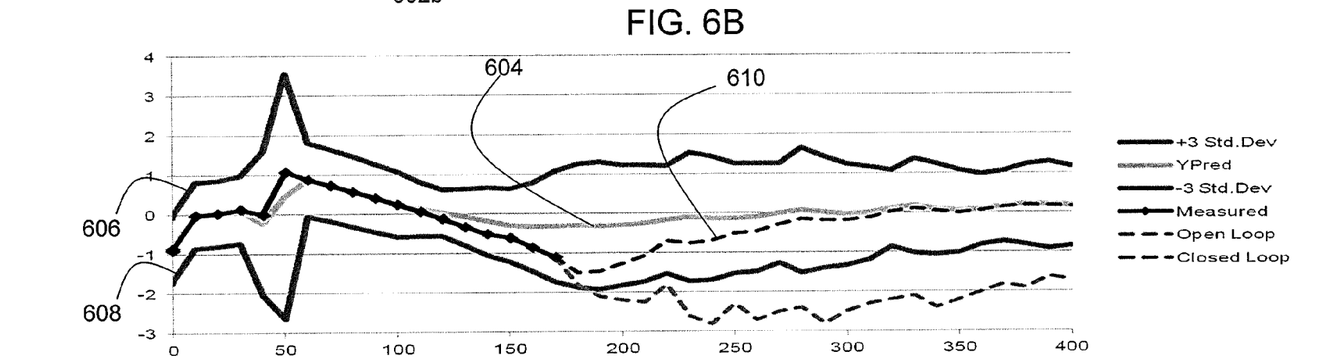

FIGS. 6A and 6B illustrate exemplary trajectories for a batch manufacturing process, which has a finite duration of 400 hours and the trajectories are computed at the maturity point of about 170 hours from the beginning of the process. In FIG. 6A, trajectory 602 captures the behavior of predicted variable values over $Y_{pred}$ the finite duration of the batch process. The predicted variable values $Y_{pred}$ can represent multivariate scores, Hotelling $T^2$ values, or DModX values. The trajectory 602 can be computed based on a combination of measured values of manipulated and dependent variables $X_k$, predicted future values of the dependent variables $X_{D\_future}$ and, optionally, future values of the manipulated variables $X_{MV}$. The trajectory 602 can be decomposed into two segments: segment 602a, which shows the past and present $Y_{pred}$ behavior up to the current maturity point, and segment 602b, which shows the predicted future $Y_{pred}$ behavior from the current maturity point to the end of the process. Specifically, segment 602b illustrates the likely effect of past and present batch behavior on the future batch behavior if no adjustments are made to the future manipulated variable values. FIG. 6A also shows an ideal $Y_{pred}$ trajectory 604 for the batch process as well as acceptable deviations 606 and 608 from the ideal trajectory 604. As shown, the predicted trajectory 602b for the batch process is outside of the acceptable deviations 606 and 608, thus indicating that the batch process is likely to deviate from normal behavior and is at risk of producing products with less than expected quality.

In response, an operator can choose to manually or automatically adjust the values of certain operating parameters at the current maturity point to improve batch quality, such as supplying a new set of values for the manipulated variables $X_{MV\_new}$. For example, as shown in FIG. 6B, after selecting a new set of values for the manipulated variables $X_{MV\_new}$, the operator can evaluate the effect of $X_{MV\_new}$ on the remainder of the batch by estimating a new future $Y_{pred}$ trajectory 610 from the maturity point to the end of the batch. The new trajectory 610 is computed from a combination of the hypothesized future values of the manipulated variables $X_{MV\_new}$, the measured values of manipulated and dependent variables $X_k$, and the predicted future values of the dependent variables $X_{D\_future}$. As shown in FIG. 6B, the new trajectory 610 is within the acceptable deviations 606 and 608, thus indicating that the new set of manipulated variables $X_{MV\_new}$ can be implemented at various process tools to improve batch quality.

The above-described techniques can be implemented in digital electronic circuitry, or in computer hardware, firmware, software, or in combinations of them. The implementation can be as a computer program product, e.g., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges ("PBX"). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communications, e.g., a communications network. Examples of communications networks, also referred to as communications channels, include a local area network ("LAN") and a wide area network ("WAN"), e.g., the Internet, and include both wired and wireless networks. In some examples, communications networks can feature virtual networks or sub-networks such as a virtual local area network ("VLAN"). Unless clearly indicated otherwise, communications networks can also include all or a portion of the PSTN, for example, a portion owned by a specific carrier.

The computing system can include clients and servers. A client and server are generally remote from each other and typically interact through a communications network. The relationship of client and server arises by virtue of computer programs running on the respective computers and having a client-server relationship to each other.

Various embodiments are depicted as in communication or connected by one or more communication paths. A communication path is not limited to a particular medium of transferring data. Information can be transmitted over a communication path using electrical, optical, acoustical, physical, thermal signals, or any combination thereof. A communication path can include multiple communication channels, for example, multiplexed channels of the same or varying capacities for data flow.

Multiple user inputs can be used to configure parameters of the depicted user interface features. Examples of such inputs include buttons, radio buttons, icons, check boxes, combo boxes, menus, text boxes, tooltips, toggle switches, buttons, scroll bars, toolbars, status bars, windows, or other suitable icons or widgets associated with user interfaces for allowing a user to communicate with and/or provide data to any of the modules or systems described herein.

While the invention has been particularly shown and described with reference to specific embodiments, it should be understood by those skilled in the art that various changes in form and detail may be made therein without departing from the spirit and scope of the invention as defined by the appended claims.

The invention claimed is:

1. A computer-implemented method for monitoring a manufacturing process in a processing facility, the method comprising:
   receiving, via a computing device from the processing facility, measured values of a plurality of variables of the manufacturing process, the plurality of variables including at least one of manipulated variables or dependent variables, the plurality of variables representing physical parameters of the manufacturing process;
   determining, with the computing device, future values of the manipulated variables or future values of the dependent variables, or a combination thereof, wherein the manipulated variables represent process parameters whose values are directly assignable during the manufacturing process and the dependent variables represent process parameters whose values are dependent on one or more process conditions;

creating, with the computing device, an unfolded data matrix using observation-wise unfolding of a batch data array, such that each row of the unfolded matrix includes observation of the plurality of variables at a unique time sample within a finite duration;

performing multivariate analysis, via the computing device, on the unfolded data matrix comprising a combination of (1) the measured values of the variables and (2) at least one of the future values of the manipulated variables or the future values of the dependent variables to generate a plurality of multivariate statistics, the plurality of multivariate statistics represent a trajectory of measured past, current and estimated future behavior of the manufacturing process; and causing, by the computing device, adjustment to one or more of the physical parameters of the manufacturing process in the processing facility based on the plurality of multivariate statistics to prevent deviation of the trajectory from a desired trajectory.

2. The computer-implemented method of claim 1, wherein the manufacturing process is a batch-type manufacturing process associated with the finite duration.

3. The computer implemented method of claim 2, wherein the variables are measured or known up to a current maturity point within the finite duration of the batch-type manufacturing process.

4. The computer implemented method of claim 3, further comprising estimating the future values of the dependent variables after the current maturity point to the end of the finite duration.

5. The computer implemented method of claim 1, further comprising predicting a future fault of the manufacturing process based on the trajectory.

6. The computer implemented method of claim 1, wherein the dependent variables are not directly assignable during the manufacturing process.

7. The computer implemented method of claim 1, wherein the values of the dependent variables are dependent on at least one of: (1) past values of the dependent variables, (2) past values of the manipulated variables, or (3) future values of the manipulated variables.

8. The computer implemented method of claim 1, wherein the future values of the manipulated variables represent known values for setting the manipulated variables at one or more future points in time.

9. The computer implemented method of claim 1, wherein each of the plurality of multivariate statistics comprises at least a multivariate score, a Hotelling's $T^2$ value, a DModX value, or any combination thereof.

10. The computer implemented method of claim 9, wherein the multivariate score comprises a principal components analysis t-score or a partial least squares analysis t-score.

11. The computer implemented method of claim 1, further comprising comparing the plurality of multivariate statistics with a time-varying reference model of the manufacturing process to detect a fault in the manufacturing process.

12. The computer implemented method of claim 1, further comprising predicting the future values of the dependent variables using at least one of an imputation method or a regression method based on at least one of the measured values of the plurality of variables or the future values of the manipulated variables.

13. The computer implemented method of claim 1, further comprising:

receiving a second set of future values of the manipulated variables, which represent hypothesized values for setting the manipulated variables; and performing multivariate analysis on a combination of (1) the measured values of the variables, (2) the second set of future values of the manipulated variables and (3) the future values of the dependent variables to generate a second plurality of multivariate statistics.

14. The computer implemented method of claim 13, wherein the second plurality of multivariate statistics predict an effect of the second set of future values of the manipulated variables on the manufacturing process.

15. A multivariate monitor for a batch-type manufacturing process associated with a finite duration, wherein the batch-type manufacturing process is performed in a processing facility and the monitor is implemented on a computing device in electrical communication with the processing facility, the monitor comprising:

one or more sensors, coupled to the processing facility, for measuring values of a plurality of variables of the manufacturing process up to a current maturity point of the finite duration, the plurality of variables including at least one of manipulated variables or dependent variables, wherein the plurality of variables represent physical parameters of the manufacturing process;

a hardware-based prediction module of the computing device for computing future values of the dependent variables after the current maturity point, wherein the dependent variables represent one or more process parameters whose values are not directly assignable;

a memory of the computing device for storing an unfolded data matrix created using observation-wise unfolding of a batch data array, such that each row of the unfolded matrix includes observation of the plurality of variables at a unique time sample within the finite duration; and a hardware-based analysis module of the computing device for performing multivariate analysis on the unfolded data matrix comprising measured values of the variables and the future values of the dependent variables to generate a plurality of multivariate statistics, the plurality of multivariate statistics represent a trajectory of measured past, current and estimated future behavior of the batch-type manufacturing process over at least a portion of the finite duration, wherein the computing device is adapted to cause adjustment to one or more of the physical parameters of the manufacturing process in the processing facility based on the plurality of multivariate statistics to prevent deviation of the trajectory from a desired trajectory.

16. The multivariate monitor of claim 15, wherein the trajectory includes predicted future behavior of the batch-type manufacturing process from the current maturity point to the end of the finite duration.

17. The multivariate monitor of claim 15, further comprising a fault detection module for predicting a future fault of the manufacturing process based on the trajectory.

18. The multivariate monitor of claim 15, wherein the prediction module is further configured to determine future values of the manipulated variables representative of a set of known values for setting the manipulated variables at one or more future points in time subsequent to the current maturity point, the manipulated variables being directly assignable during the manufacturing process.

19. The multivariate monitor of claim 18, wherein the analysis module performs multivariate analysis on the unfolded data matrix comprising a combination of the measured values of the variables, the future values of the manipulated variables and the future values of the dependent variables to generate the plurality of the multivariate statistics.

20. The multivariate monitor of claim 18, wherein the prediction module computes the future values of the dependent variables using at least one of a regression method or an imputation method based on at least one of the measured values of the plurality of variables or the future values of the manipulated variables.

21. The multivariate monitor of claim 15, wherein each of the plurality of the multivariate statistics comprises at least a multivariate score, a Hotelling's $T^2$ value, a DModX value, or any combination thereof.

* * * * *